(12) United States Patent
Roach

(10) Patent No.: US 6,257,358 B1
(45) Date of Patent: Jul. 10, 2001

(54) MOTORIZED UTILITY CART WITH HOPPER DUMPING MECHANISM

(76) Inventor: Sidney Vinson Roach, 207 48th St., Gulfport, MS (US) 39507

( * ) Notice: Subject to any disclaimer, the term of this patent is extended or adjusted under 35 U.S.C. 154(b) by 0 days.

(21) Appl. No.: 09/353,873

(22) Filed: Jul. 15, 1999

(51) Int. Cl.[7] .................................................. B62D 51/04
(52) U.S. Cl. ........................ 180/19.1; 180/19.2; 280/79.2
(58) Field of Search ................... 180/19.1, 19.2, 180/19.3, 65.5; 280/79.11, 79.2

(56) References Cited

U.S. PATENT DOCUMENTS

| | | | |
|---|---|---|---|
| 2,918,133 | * 12/1959 | Ericsson | 180/19.1 |
| 3,323,837 | * 6/1967 | Landry | 298/2 |
| 3,572,455 | 3/1971 | Brueske . | |
| 4,167,983 | 9/1979 | Seider et al. . | |
| 4,645,264 | * 2/1987 | Morrison | 298/1 |
| 4,682,145 | * 7/1987 | Brawner, Jr. | 340/52 |
| 4,811,988 | * 3/1989 | Immel | 298/2 |
| 5,064,012 | 11/1991 | Lusego . | |
| 5,284,218 | * 2/1994 | Rusher, Jr. | 180/19.1 |
| 5,350,030 | 9/1994 | Mawhinney et al. . | |
| 5,397,172 | * 3/1995 | Musso, Jr. et al. | 298/22 |
| 5,685,385 | 11/1997 | Sanuga . | |

FOREIGN PATENT DOCUMENTS

| | | |
|---|---|---|
| 1133775 | 4/1957 | (FR) . |
| 2610256 | 8/1988 | (FR) . |

* cited by examiner

*Primary Examiner*—Daniel G. DePumpo
*Assistant Examiner*—James S. McClellan

(57) ABSTRACT

A utility cart having a platform supported by a pair of casters at its front and a pair of traction wheels at its rear. A pair of battery-powered motors drive the traction wheels and are controlled by switches secured to a handlebar extending upwardly from the rear of the platform. A hopper is pivotally mounted atop the platform and its rear end may be elevated by a motorized dumping mechanism. The hopper is provided with a dual-hinge, swinging gate at its front end which permits the hopper to be unloaded with great ease.

5 Claims, 2 Drawing Sheets

MOTORIZED UTILITY CART WITH HOPPER DUMPING MECHANISM

FIELD OF THE INVENTION

The present invention relates generally to motor vehicles steered by walking attendants.

BACKGROUND OF THE INVENTION

Carts of various sorts have been used around the home and in business settings to haul goods from one place to another. Many of these carts are of uncomplicated construction, lacking automated features and costing relatively little. Others, produced at great expense, can transport large and heavy loads with minimal human intervention. A need presently exists for a utility cart which fills a niche between these two extremes.

SUMMARY OF THE INVENTION

In light of the problems associated with the prior art, it is a principal object of the invention to provide residential and commercial users with a motorized utility cart for transporting heavy and bulky loads of minimal complexity and cost.

It is another object of the invention to provide a utility cart of the type described with motor-driven, traction wheels whose speed and direction of rotation are controlled by a walking attendant.

Still another object of the invention is to provide a utility cart with a load-carrying hopper which may be automatically elevated for dumping.

It is a further object of the invention to a utility cart with a hopper that may be readily detached from a supporting platform so that loads having dimensions large than the hopper can be carried directly upon the platform without impediment.

It is an additional object of the invention to provide a utility cart with a "three-way," swinging gate which: pivots up, pivots down, and is removable for expedited loading and unloading its associated hopper.

It is an object of the invention to provide improved elements and arrangements thereof in a utility cart for the purposes described which is lightweight in construction, inexpensive to manufacture, and dependable in use.

Briefly, the cart in accordance with this invention achieves the intended objects by featuring a platform supported by casters and traction wheels. Atop the platform is positioned a hopper which may be lifted by a motorized dumping mechanism for dumping through a swinging gate. The hopper may be detached from the platform and lifting mechanism, if desired, by means of removable pins. Similar pins permit the gate to be operated from different positions on the hopper. A handlebar extends upwardly from the platform and supports a plurality of switches for selectively controlling the direction of electric current flow to the motors powering the wheels and dumping mechanism.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
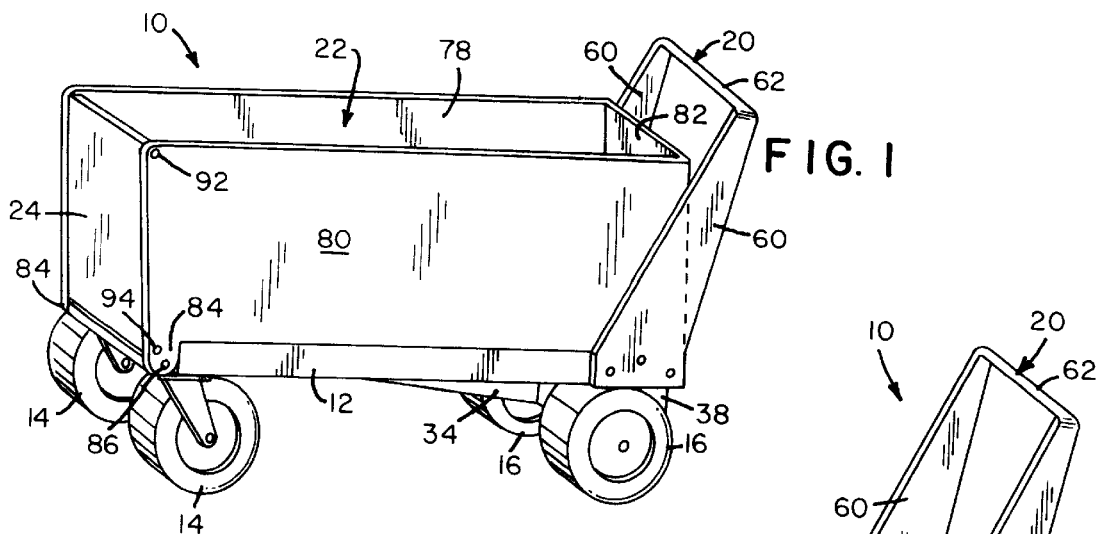
FIG. 1 is a perspective view of a utility cart in accordance with the present invention with its hopper in a lowered position.
Figure 2:
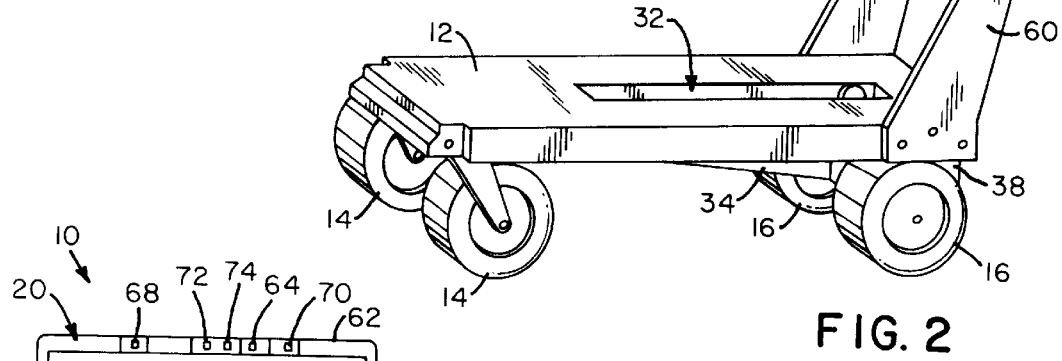
FIG. 2 is a perspective view of the utility cart of FIG. 1 with its hopper removed.
Figure 3:
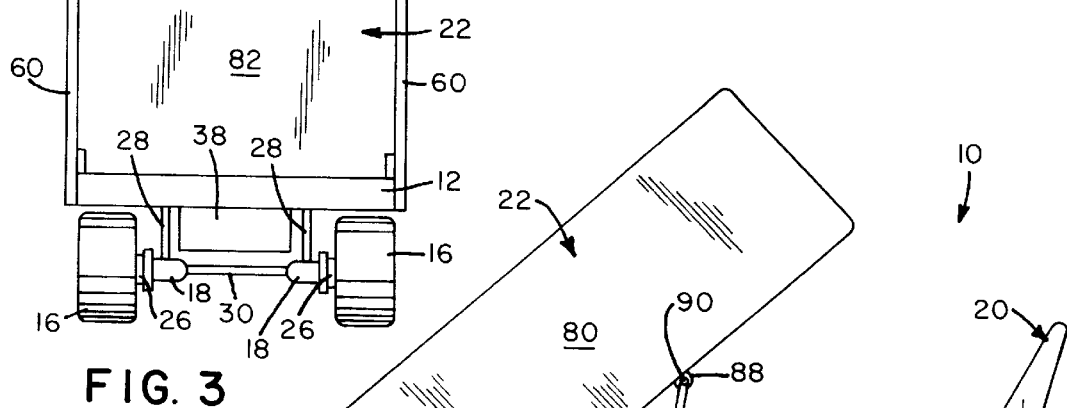
FIG. 3 is a rear view of the utility cart.

Referring now to the FIGS., a utility cart in accordance with the present invention is shown at 10. The cart 10 includes a platform 12 supported by a pair of casters 14 at its front and a pair of traction wheels 16 driven by electric motors 18 at its rear. A handlebar 20 extends upwardly from the rear of platform 12 so that a walking user may guide cart 10. A hopper 22 is pivotally mounted atop platform 12 so that the rear end of hopper 22 may be elevated for dumping. A swinging gate 24 at the front end of hopper 22 quickens material discharge therefrom.

Platform 12 is rectangular in shape and has a caster 14 or wheel 16 mounted at each of its four corners. Each caster 14 is adapted to turn freely about its horizontal and vertical axes. Each wheel 16, however, is carried by the drive shaft 26 of a motor 18 and may be rotated only about a fixed horizontal axis. Motors 18 are attached to the underside of platform 12 by vertical struts 28. Lateral support to motors 18 is offered by a horizontal rod 30 which connects their inner ends together.

Platform 12 is provided with a longitudinal slot 32 between its front and rear ends. Secured within slot 32 is an open-topped receptacle 34 which serves as a housing for the hopper dumping mechanism 36. As shown, a portion of receptacle 34 is suspended from the underside of the platform 12 and the rear end of this suspended portion offers an attachment point for battery housing 38.

Dumping mechanism 36 includes an electric motor 40 mounted at the rear end of receptacle 34. A threaded, drive shaft 42 extends forwardly from motor 40 and is rotated when motor 40 is energized. At its front end, shaft 42 is journaled in a bearing 44 affixed to platform 12 by support member 46 to which a rearwardly-extending, lifting arm 48 is also pivotally attached by pin 50. An internally threaded sleeve 52 is engaged with shaft 42 such that sleeve 52 may be driven along shaft 42 when motor 40 is energized. Sleeve 52 and the middle of arm 48 are connected by a link 54. Link 54 is connected by a pivot pin 56 to sleeve 52 and by a pivot pin 58 to arm 48.

Handlebar 20 includes a pair of uprights 60 connected by a cross piece 62 in an inverted "U" shape. The uprights 60 are bolted or otherwise secured at their bottom ends to the sides of platform 12. The upper ends of uprights 60 support cross piece 62 which is shaped for comfortable grasping by a user.

The cross piece carries a manually operated switch 64 which connects motor 40 to electrical current source— storage battery 66. Switch 64 is of self-centering type and serves to control, in a conventional manner, the direction of electrical current flow through motor 40. Selective operation of motor 40 in one direction serves to drive sleeve 52 forwardly on shaft 42 and elevate arm 48 by means of link 54. Operation of motor 40 in an opposite direction moves sleeve 52 rearwardly on shaft 42 and lowers arm 48.

Cross piece 62 also carries manually operated switches 68, 70 and 72 which connect motors 18 to battery 66. Switches 68 and 70 are self-centering and control the direction of electrical current flow through motors 18. Thus, rotation of motors 18 and wheels 16 in a forward or reverse direction may be regulated by a user. Of course, the independent operation of switches 68 and 70 permits cart 10 to be steered in any direction. The switch 72, on the other hand, serves to selectively disconnect motors 18 and 40 from battery 66.

Cross piece 62 also carries a variable resistor 74. The resistor 74 is manually operated and is connected between battery 66 and motors 18 to control electrical current flow to motors 18 and thereby their speed. Increased current flow to motors 18 increases their speed and the revolutions per minute (rpm) of wheels 16. Similarly, decreased electrical current flow to motors 18 reduces the rpms of wheels 16.

Hopper 22 has a bottom wall 76, a pair of side walls 78 and 80, and a rear wall 82 which are rigidly attached together so as to form a box open at its top and front. A pair of flanges 84 extend downwardly from the front ends of side walls 78 and 80. A pin 86 extends through each flange 84 into the platform 12 to pivotally join hopper 22 and platform 12. A retaining tab 88 extends downwardly from the rear of hopper 22 and is adapted to fit into slot 32 in platform 12 when hopper 22 is lowered. The tab 88 is pivotally connected by a pin 90 to the rear end of arm 48 of dumping mechanism 36.

Figure 4:
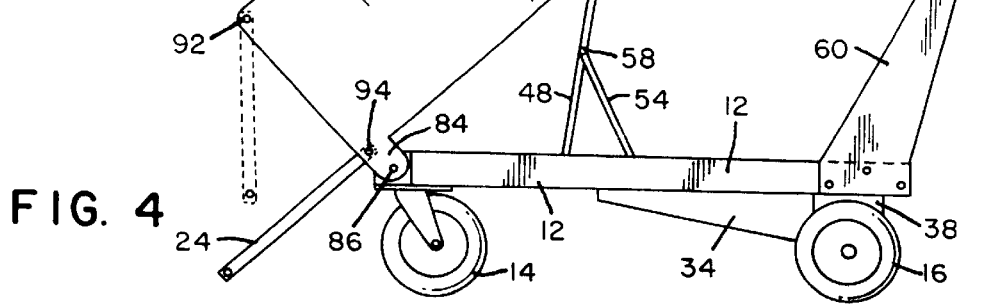
FIG. 4 is a side view of the utility cart with its hopper in an elevated, dumping position and with an alternative positioning for the swinging gate shown in broken lines.
Figure 5:
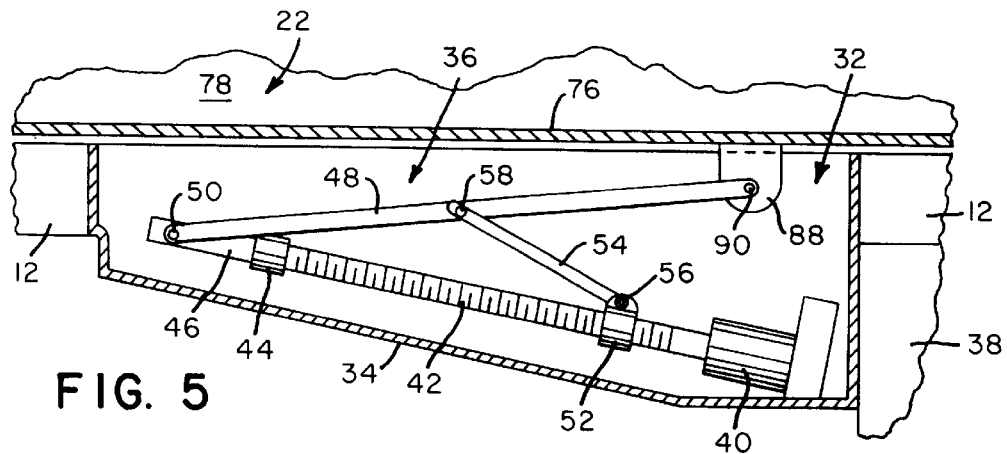
FIG. 5 is a cross-sectional view illustrating details of the hopper lifting mechanism.
Figure 6:
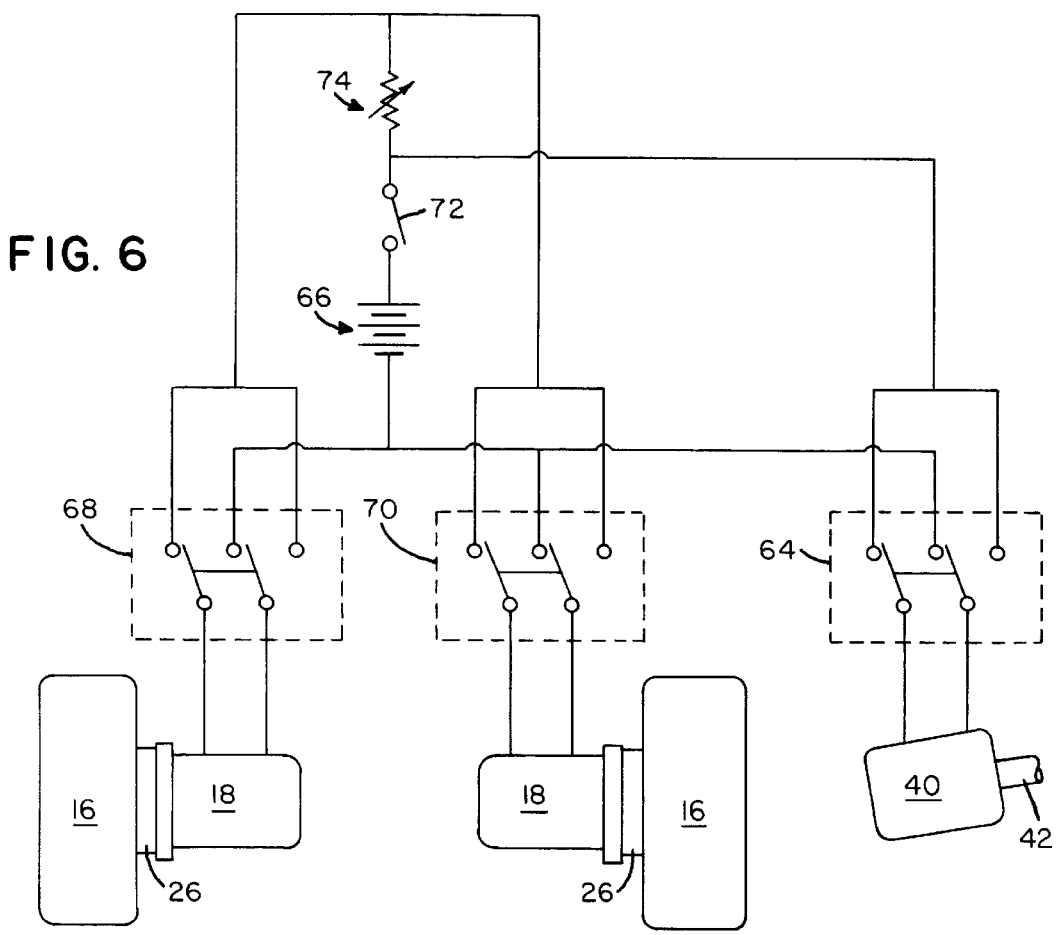
FIG. 6 is a schematic diagram illustrating the electrical control system for the utility cart.

The gate 24 is secured by pins 92 and 94 to side walls 78 and 80 so as to selectively close the front of hopper 22. Withdrawal of upper pins 92, for example, permits gate 24 to pivot downwardly and serve as a ramp as shown by solid lines in FIG. 4. Selective withdrawal of lower pins 94, however, permits gate 24 to swing from its top as shown by broken lines in FIG. 4. Of course, removing all of pins 92 and 94 permits gate 24 to be disassociated completely from the remainder of hopper 22.

Preferably, each of the pins 84, 88, 92 and 94 are removably positioned in axially aligned sockets (not shown) within the components that such attach together. The pins 84, 88, 92 and 94 may be of any suitable type and may be threaded fasteners. Thus, the gate 24 may be removed from hopper 22 and hopper 22 may be detached from platform 12 and arm 48 easily to carry large or unusually shaped loads if desired.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A utility cart, comprising:

a substantially horizontal platform extending substantially the entire length of said utility cart having a front and a rear;

a storage battery carried by said platform;

a pair of casters attached to, and positioned beneath, the front of said platform;

a pair of traction wheels attached to, and positioned beneath, the rear of said platform;

a pair of electric motors electrically connected to said storage battery for driving said traction wheels, each of said electric motors being respectively coupled to one of said traction wheels;

a handlebar secured to, and extending upwardly from, said platform; and, a pair of switches mounted on said handlebar for selectively controlling the direction of electric current flow to said electric motors thereby permitting said electric motors to operate in forward and reverse directions, each of said switches being respectively connected between said storage battery and one of said electric motors; a load-carrying hopper pivotally positioned atop said platform, and said hopper being detachable from said platform; and a motorized dumping mechanism for elevating one end of said hopper, said dumping mechanism including: a third electric motor secured to said platform and electrically connected to said storage battery, said third electric motor having a threaded, drive shaft extending therefrom; a lifting arm having opposed ends respectively, pivotally connected to said platform and said hopper; an internally threaded sleeve on said drive shaft such that said sleeve may be driven along said drive shaft when caused to rotate by operation of said third electric motor; and, a link having opposed ends pivotally connected to the middle of said lifting arm and said internally threaded sleeve.

2. The utility cart according to claim 1 wherein said hopper includes a pair of opposed side walls and an opening therebetween, said opening being selectively closed by a swinging gate having upper and lower ends secured to said opposed side walls by removable pins such that said swinging gate may be selectively suspended by said removable pins from said opposed side walls at either of its upper or lower ends.

3. A utility cart, comprising:

a platform having a front, a rear, and a longitudinal slot positioned between the front and the rear of said platform;

a hopper having a front and a rear, said hopper being positioned atop, and being pivotally secured at its front to the front of, said platform, said hopper having a pair of opposed side walls and an opening therebetween, said opening being selectively closed by a swinging gate having upper and lower ends secured to said opposed side walls by removable pins whereby said swinging gate may be selectively suspended by said removable pins from said opposed side walls at either of its upper or lower ends;

a lifting mechanism positioned within said longitudinal slot in said platform for elevating the rear of said hopper;

a storage battery carried by said platform;

a pair of casters attached to the front of said platform;

a pair of electric motors attached to the rear of said platform and being electrically connected in parallel to said storage battery, each of said electric motors having a rotatable drive shaft;

a pair of traction wheels each respectively mounted on the drive shaft of one of said electric motors;

a handlebar secured to, and extending upwardly from, said platform; and, a pair of switches mounted on said handlebar for selectively controlling the direction of electric current flow to said electric motors thereby permitting said electric motors to operate in forward and reverse directions, each of said switches being respectively connected between said storage battery and one of said electric motors.

4. The utility cart according to claim 3 wherein said dumping mechanism includes:

a third electric motor secured to said platform and electrically connected to said storage battery, said third electric motor having a threaded, drive shaft extending therefrom;

a lifting arm having opposed ends respectively, pivotally connected to said platform and said hopper;

an internally threaded sleeve on said drive shaft such that said sleeve may be driven along said drive shaft when caused to rotate by operation of said third electric motor;

a link having opposed ends pivotally connected to the middle of said lifting arm and said internally threaded sleeve.

5. A utility cart, comprising:

a platform having a front, a rear, and a longitudinal slot with opposed first and second ends positioned between the front and the rear of said platform;

a hopper having a front end and a rear end, said hopper being pivotally secured by first removable pins at its front end to the front of said platform, said hopper having a pair of opposed side walls and an opening therebetween, said opening being selectively closed by a swinging gate having upper and lower ends secured to said opposed side walls by second removable pins;

a lifting mechanism positioned within said longitudinal slot for elevating the rear end of said hopper;

a first electric motor secured at the first end of said slot and having a threaded, drive shaft extending therefrom and journaled to the second end thereof, said first electric motor being electrically connected to said storage battery;

a lifting arm having opposed ends respectively, pivotally connected to said second end of said slot and said hopper;

an internally threaded sleeve movably positioned on said drive shaft such that said sleeve may be driven along said drive shaft when said drive shaft is caused to rotate by operation of said first electric motor;

a link having opposed ends pivotally connected to the middle of said lifting arm and said internally threaded sleeve;

a storage battery carried by said platform;

a pair of casters attached to the front of said platform;

a pair of second electric motors attached to the rear of said platform and being electrically connected to said storage battery, each of said second electric motors having a rotatable drive shaft;

a pair of traction wheels each respectively mounted on said rotatable drive shaft of one of said second electric motors;

a handlebar secured to, and extending upwardly from, the rear of said platform; and, a plurality of switches mounted on said handlebar for selectively controlling the direction of electric current flow to said first and second electric motors thereby permitting said first and second electric motors to operate in forward and reverse directions, each of said switches being respectively connected between said storage battery and one of said first and second electric motors.

\* \* \* \* \*